United States Patent

[11] 3,548,947

| [72] | Inventor | Matthew P. Mackay-Smith<br>Coatesville, Pa. (R.D. 1, Newark, Del., 19711) |
|---|---|---|
| [21] | Appl. No. | 791,343 |
| [22] | Filed | Jan. 15, 1969 |
| [45] | Patented | Dec. 22, 1970 |

[54] HORSESHOE
5 Claims, 9 Drawing Figs.

[52] U.S. Cl. ................................................ 168/29, 168/4
[51] Int. Cl. .................................................. A01l 07/04
[50] Field of Search ........................................ 268/29—43

[56] References Cited
UNITED STATES PATENTS

| D. 23,661 | 9/1894 | Wiswell | 168/29 |
|---|---|---|---|
| 280,071 | 6/1883 | Nickerson | 168/35 |
| 329,700 | 11/1885 | Bellamy | 168/29 |
| 658,884 | 10/1900 | Weber | 168/29 |
| 766,039 | 7/1904 | Hoffman | 168/29 |
| 792,674 | 6/1905 | Snook et al. | 168/34 |
| 1,191,413 | 7/1916 | Gauthier | 168/29 |
| 1,397,046 | 11/1921 | Haller | 168/29 |
| 1,447,153 | 2/1923 | Sala | 168/29 |
| 3,460,627 | 8/1969 | Teixeira | 168/24X |

*Primary Examiner*—Aldrich F. Medbery
*Attorney*—Semmes & Semmes

ABSTRACT: A horseshoe made especially for racehorses in which the normal hoof axis relative to supporting tendon and bone alignment is preserved as the foot flies into, supports and retracts out of the track dirt-fluid medium. The horse shoe is characterized by having an inset grab caulk under the toe of a naturally trimmed foot to prevent back-slipping, plus corresponding dart configured caulks adjacent the trailing edge caulk and extending posteriorly to ensure against side slippage.

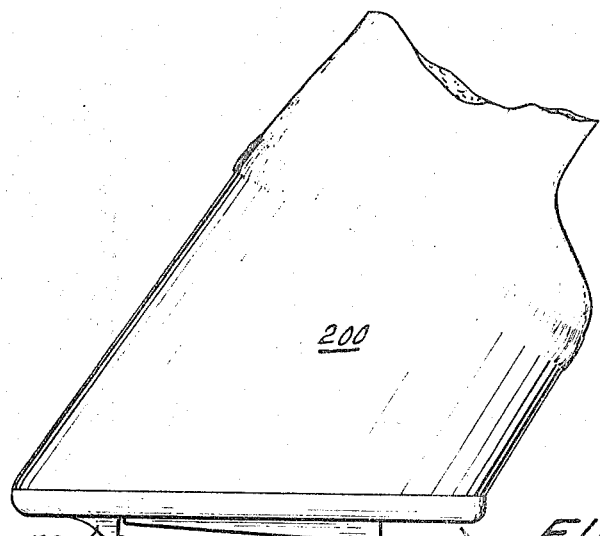
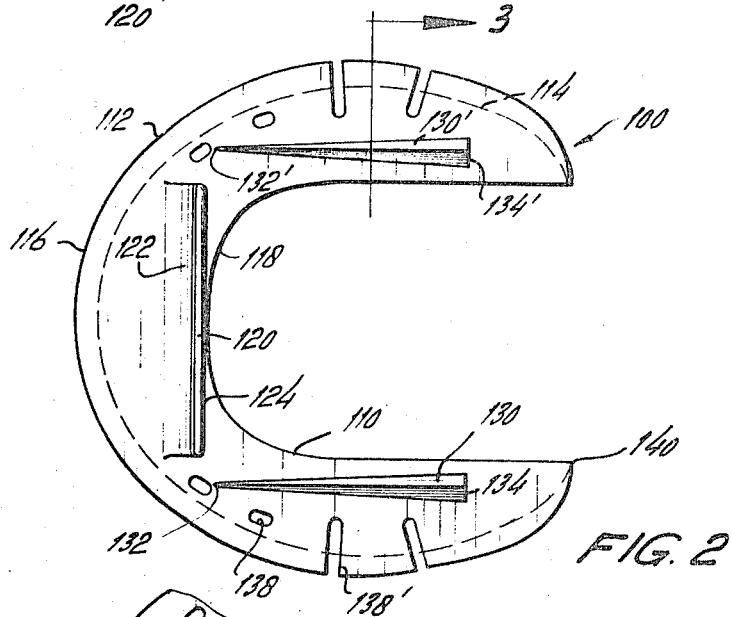
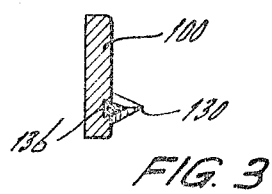
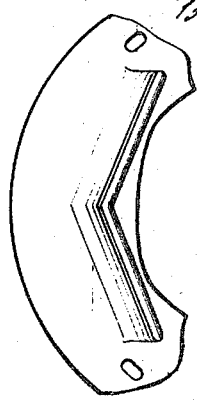

INVENTOR
MATHEW P. MACKAY-SMITH

BY Semmes and Semmes
ATTORNEYS

HORSESHOE

BACKGROUND OF THE INVENTION

1. Field of the Invention

Whereas the field of invention is defined in terms of American Race Tracks having loam and dirt bases, rendered of varying consistency by the addition of water, it will be obvious that the invention is equally adapted to any comparable race track to include turf, the consistency of which is such as to cause the foot and attached shoe to enter as a solid object enters a fluid medium of variant density, rendering partial or full support.

2. Description of the Prior Art

It is generally known that the thoroughbred racehorse's hoof, when landing in the fluid medium of an American dirt track, functions in a fluid medium of fine loose loam, which is rendered thicker or thinner by the addition of water. It is supported instantaneously on a more compacted clay. In the course of racing, the properly trimmed and balanced forefoot enters this fluid medium first on the heels with progressive anterior extension of entry. If the bars of the hoof are intact, the frog full and no toe "grab" is present, the fluid dirt will tend to concentrate and compact under the foot, forming a solid uniform basis of support, but as the bare or smooth-shod hoof retracts, there is a tendency for it to slip backwards, causing excessive strain and loss of forward motion to the racing animal. To compensate for this, toe "grabs" are widely used to prevent back-slipping with its consequent loss of inertia and speed. In practice, the toe "grab" is generally of the "leading edge" type. If, however, the leading edge caulk is placed on a properly trimmed foot having its forward portion thereof at an acute angle with respect to the flat ground, the placement of the caulk causes an excessive leverage on the point of support, thereby fatiguing the animal unnecessarily. Thus, in practice, the foot of the horse is trimmed "short," reference FIGS. 8 and 9, herein. This type of shoeing results in "cupping out" in American dirt track surfaces. To avoid this, the current practice has been to lower the heels of the shoe as much as possible, but this then results in excessive strain on the tendons as the foot settles and during retraction. To recapitulate, the foot is maltrimmed first and misshod second, resulting in the foot attacking the fluid medium of the racing track either flat or toe first, thus pushing the fluid loam in the front of the foot, vacating loam behind the grab, tending to deviate the foot in or out of the true line of flight thereof, and by removal of support causing excessive strains on the foot, as superficial and deep tendons and leg bone pick up the weight of the horse in running. Obviously, any deviation from the proper attitude of support subjects the entire leg to unnecessary destructive stresses and strains. By proper attitude of support is meant that axial relation between hoof and attached bone that will achieve maximum running support with minimal abnormal stress such as may be developed by slippage, deviation in flight or improper point of hoof leverage.

SUMMARY OF THE INVENTION

The invention comprises a system of trimming and shoeing the racehorse's forward feet such as to ensure proper balance, leverage and weight support as the forefoot enters the supporting dirt track fluid medium, yielding thereby maximum traction, resistance to slipping back, guidance as it passes through the fluid medium and as it settles and is retracted therefrom, following balanced weight support with the least possible stress on the tendons and related bone structure.

In this concept, the trailing edge caulk of the shoe is inset and placed as a fulcrum adjacent the forward portion of the heel caulks, the heel caulks each being in dart configuration and extending substantially longitudinally.

BRIEF DESCRIPTION OF THE DRAWINGS

In the drawings:

FIGS. 1 and 2 are respectively side elevation and bottom plan views of the novel shoe attached to the properly trimmed hoof of a horse, showing the relative disposition of the respective caulks;

FIG. 3 illustrates a means for attaching the heel caulks to the shoe, per se;

FIG. 4 shows a modification of the forward caulk shown in FIGS. 1 through 3 inclusive;

DESCRIPTION OF THE PREFERRED EMBODIMENTS

Figures 5, 6, 7:
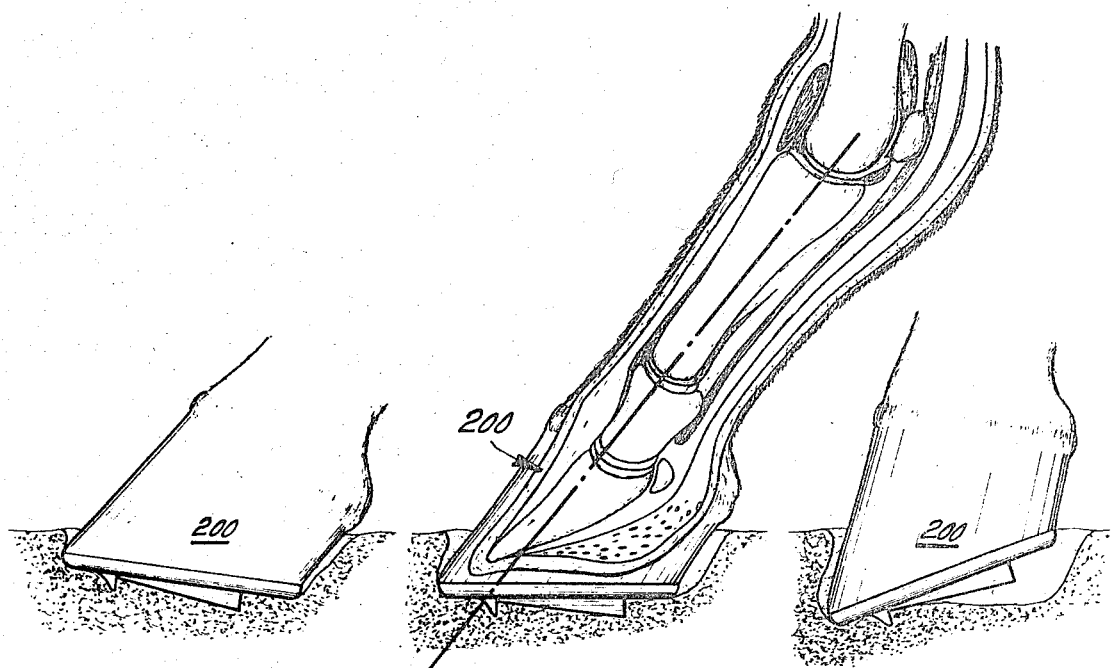
FIGS. 5, 6 and 7 are side elevational views illustrating entry, support and retraction respectively of the forefoot of a horse in running and FIG. 6 especially the correlative balanced positioning of the foot with respect to bone and tendon structure.

Referring now to FIG. 1, the hoof 200 is shown to be properly and naturally trimmed. It is noteworthy that the forward slope of the exterior wall of the hoof meets the ground at an acute angle which is that of a properly trimmed bare foot. It has not been "dubbed." To the foot is attached the horseshoe 100 of the present invention. This shoe is preferably made of a high tensile super light alloy, and the caulks are made of more dense medium such as carborundum or borium. Shoe 100 comprises a basically flat tread having interior edge 110 and exterior edges 112 conforming in general to the wall of the foot of a horse, the outer edges being preferably wider than the norm, permitting shaping in shoeing the horse, for example, to the point shown by phantom line 114.

The leading edge of the shoe is indicated at 116 and the trailing edge of the toe at 118. Immediately adjacent and substantially in line with the trailing edge 118 of the shoe is the trailing edge caulk 120 which is inset substantially from the toe 116, the general configuration of caulk 120 conforming to the inflight streamline concave face wall 122 and terminating in grab wall 124 which said wall is generally parallel to the central portion of the inner edge 118 of the shoe. The respective heel caulks 130 and 130' extend lengthwise of the shoe and are dart or wedge shaped in a tapered design having pointed nose 132, 132', terminating in the flat posterior wall 134, 134'. These caulks may be fitted into the shoe 100 by conventional means 136. The same or similar wedge system would apply to the trailing edge caulk 120. Conveniently spaced peripherally about are the interior nail holes 138 and posterior nail recesses 138', the latter being open ended and serving to permit more accurate placement of critical nails whereby the excess of the shoe may be ground off as indicated by the phantom line 114.

With reference to FIGS. 5, 6 and 7, it will be noted that the angle of attack and flight of the foot upon entry is such as to preserve compacted supporting loam medium beneath the entire foot and especially the toe area, placing the foot in its weight bearing capacity in the position shown in FIG. 6, whereby the hoof axis is in line with the supporting axes of tendon and bone structure as indicated. This, then, places the toe of the foot in a position to break over naturally, (FIG. 7), to align the foot in flight in a balanced condition through the inflight guidance of the respective heel caulks; to prevent back-slipping; to prevent thereby side-slipping during landing support and breaking over.

Figures 8, 9:
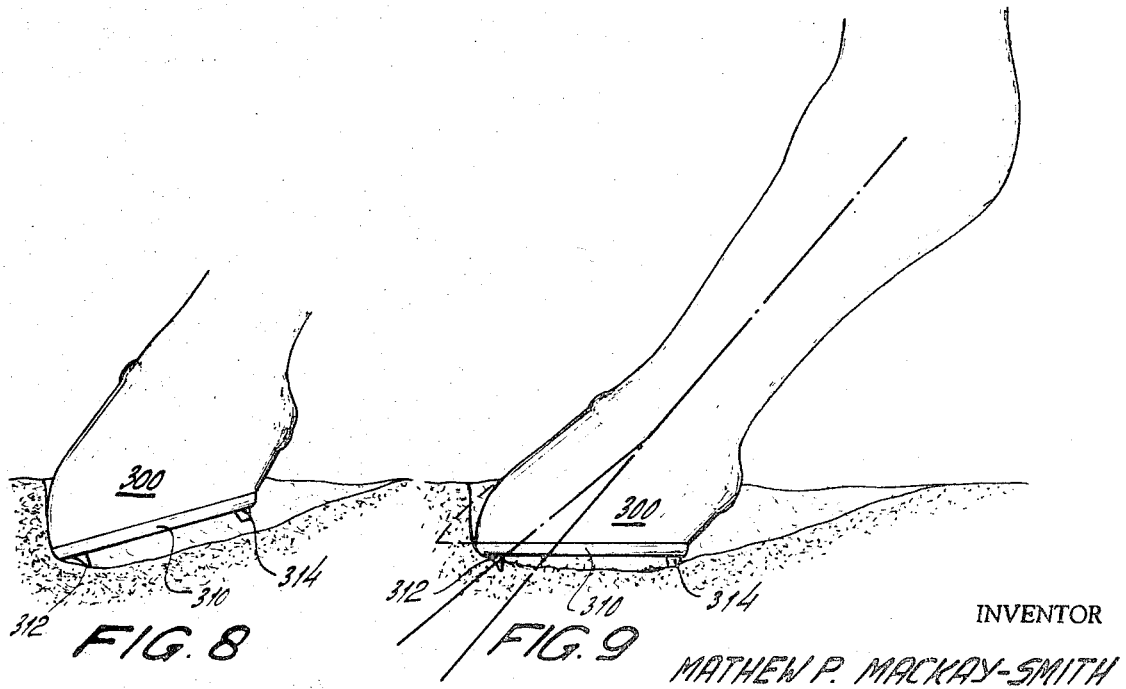
FIGS. 8 and 9 illustrate conventional shoeing with unnatural trimming, illustrating the effect thereof in action as contrasted to the advantageous effect shown in the adaptation of the invention, reference FIGS. 5—7 inclusive.

The deficiencies illustrated in FIG. 8 and FIG. 9 conventional systems are apparent as the entry of the hoof 300 and shoe caulk 312 in flight is such as to compact the fluid medium forward of the hoof, to "cup out" and excavate the critical supporting area immediately adjacent and rearward of the toe caulk and lastly to break continuity in the axes of hoof and critical supporting tendons and bones of the horse's leg. Note the phantom line toe, removed by dubbing to compensate, as indicated, but the result of which is to destroy the natural toe support in retraction.

From the foregoing it will be apparent that various modifications to the invention can be made without departing from the spirit of the invention as defined in the appended claims.

I claim:
1. An improved horseshoe adapted to the naturally trimmed forefoot of racing horses, comprising:
   A. a substantially flat shoe, the exterior edges of the shoe conforming to the wall of the hoof;
   B. a toe caulk which is inset from the leading edge and near the trailing edge of the shoe to provide a balancing fulcrum, said toe caulk extending substantially transversely of the shoe;
   C. corresponding parallel tapered heel caulks extending from a point adjacent the toe caulk posteriorly thereof, the respective heel caulks each being of increased height from front to rear, the transverse dimension thereof likewise increasing from front to rear, said heel caulks each defining balancing wedges.

2. The improved horseshoe of claim 1 in which the toe caulk is straight from end to end.

3. The improved horseshoe of claim 1 in which the toe caulk defines a dihedral from end to end.

4. An improved horseshoe adapted to the naturally trimmed forefoot of racing horses, comprising:
   A. a substantially flat shoe, the exterior edges of the shoe conforming to the wall of the hoof;
   B. a toe caulk at an inset position from the leading edge and near the trailing edge of the shoe to provide a balancing fulcrum, said toe caulk being concave at its leading wall face and extending substantially transversely of the shoe;
   C. corresponding heel caulks extending lengthwise from a point adjacent the toe caulk posteriorly thereof, the respective heel caulks each being of increased height from front to rear, the transverse dimension thereof increasing, likewise from front to rear, said heel caulks each defining balancing wedges.

5. The improved horseshoe of claim 4 in which the toe caulk defines a dihedral from end to end.